No. 735,128. PATENTED AUG. 4, 1903.
J. W. MURPHY.
COMBINED BEVEL AND SQUARE.
APPLICATION FILED JAN. 12, 1903.
NO MODEL.
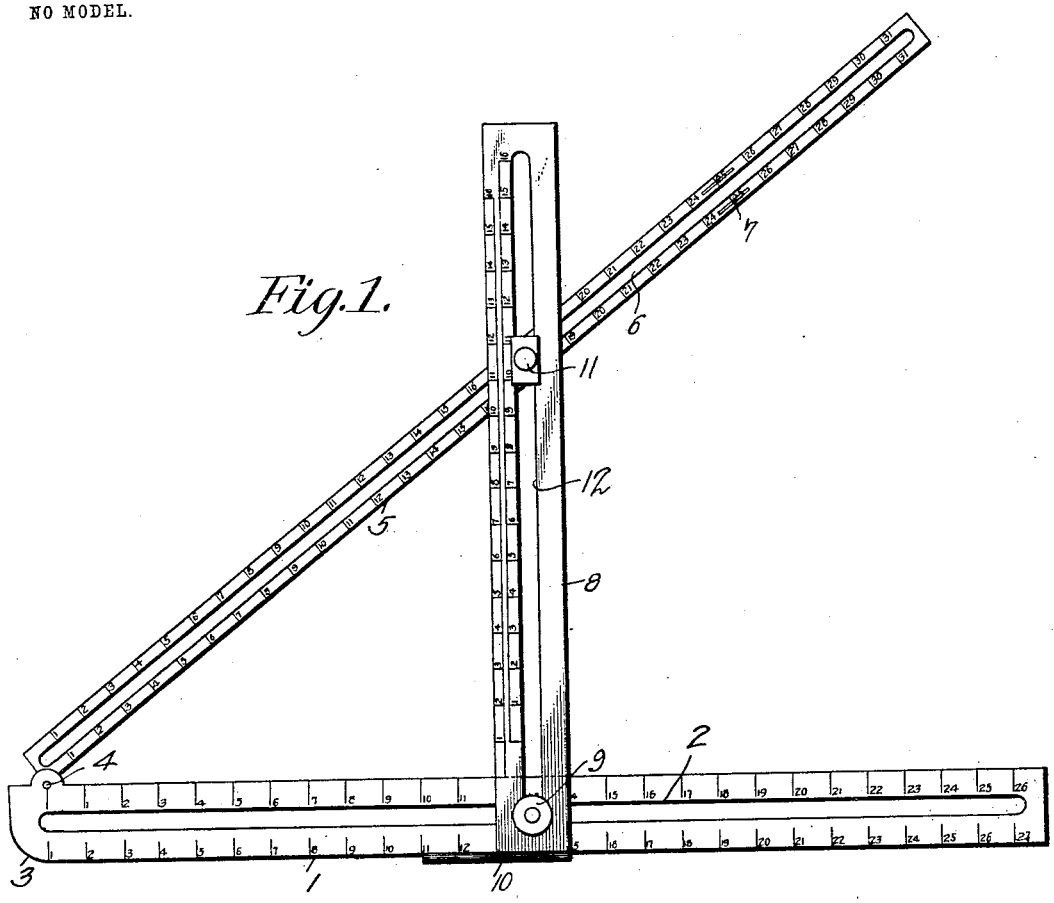
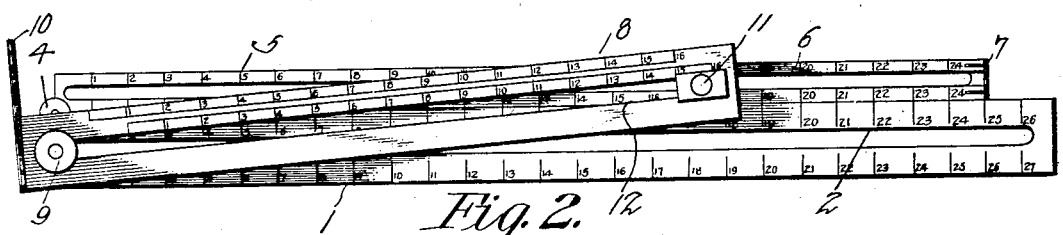
J. W. Murphy, Inventor;
by C. A. Snow & Co.
Attorneys
Witnesses
E. F. Stewart
Baxter Morton No. 735,128. Patented August 4, 1903.

UNITED STATES PATENT OFFICE.

JAMES W. MURPHY, OF ALVA, OKLAHOMA TERRITORY.

COMBINED BEVEL AND SQUARE.

SPECIFICATION forming part of Letters Patent No. 735,128, dated August 4, 1903.

Application filed January 12, 1903. Serial No. 138,712. (No model.)

*To all whom it may concern:*

Be it known that I, JAMES W. MURPHY, a citizen of the United States, residing at Alva, in the county of Woods and Territory of Oklahoma, have invented a new and useful Combined Bevel and Square, of which the following is a specification.

My invention relates to combined bevels and squares for use by carpenters, builders, architects, and others; and it consists of the mechanism fully described and claimed in the following specification and shown in the drawings.

The objects contemplated in my invention are to produce an instrument of the class described which shall be simple in construction, which shall be readily adjusted to make the measurements commonly made with such instruments, which shall be durable in use, and which may be folded into very small compass to facilitate storage when not in use. In previous devices of this class, so far as I am aware, all of these objects have never been successfully attained in a single instrument. In general instruments susceptible of a considerable variety of adjustments have been complicated in structure and have not been adapted to stand for any length of time the wear and tear of actual service. Furthermore, instruments of this class have seldom been so constructed that they could be folded into an exceedingly compact form, so as to be entirely out of the way in the carpenter's tool-chest when out of use. This is particularly true of squares, in which it has been difficult to secure a structure which in operative position should always be accurate and possess the required rigidity and when in inoperative position be folded into small compass.

All of the foregoing objects are attained in the construction illustrated in the accompanying drawings, of which—

Figure 1 is a plan view of my combined bevel and square in unfolded position ready for use. Fig. 2 is a plan view of the instrument folded into compact form for storage. Fig. 3 is a side view of the instrument when folded.

Similar characters of reference indicate corresponding parts in the several figures.

In the preferred form shown my invention consists of a base member 1, slotted at 2 and having one end formed into an arc of ninety degrees, as shown at 3. This base member is graduated along both edges, as shown, the preferred graduation being one in which the divisions are marked in inches and twelfths of inches, the object of this form of graduation being to adapt the scale marked on the instrument in inches and parts thereof to correspond to measurements to be made upon timbers which are commonly made in feet and inches. It is obvious that the measurement made upon the instrument in inches and twelfths thereof can readily be converted into a measurement on timbers of feet and inches.

Hinged to the base 1 at 4 is an arm 5, slotted in the same manner that the base is by a slot 6 running longitudinally thereof and terminating near the ends, but narrower in width than that shown in the base member. The arm 5 is shown as hinged at 7, the object of this hinge being to facilitate the folding of the instrument.

Slidably mounted on the base 1 and secured thereto by means of a thumb-screw is an arm 8. The thumb-screw 9 serves, in connection with a plate 10 integral with the arm 8 and projecting at right angles to the surface thereof, to hold the arm 8 rigidly perpendicular to the base 1 when it is desired to secure the arm at any point upon the base. A thumb-screw 11 is also employed to pass through the slot in the pivoted arm 5 and a similar slot 12 in the sliding arm 8 to secure said arms together at any desired point.

It will be observed that the graduations on the arms 5 and 8 correspond in character to those on the base member 1. The graduations on the arm 5, as well as those on the base member, start from the point 4 at which these two members are hinged together. The graduations on the sliding arm 8 begin at the point where the arm 8 crosses the base member 1.

The manner of using my combined bevel and square is substantially as follows: Let it be assumed that it is desired to determine the proper bevels and length of a rafter for a house, the width of the house and the height of the ridge-pole above the plane of the eaves being known. Let the height of the ridge-pole be taken as ten feet and the total width of the house be twenty-four feet. In order to determine the length of the rafter required, the thumb-screw 9, used to clamp the members in position, is released. The arm 8 is then slid along the base member until the graduated margin of said member is at the point 12 on the scale of the base member, where it is then clamped in position. The thumb-screw 11, connecting the arms 5 and 8, being free, the pivoted member 5 may be swung along the arm 8 until its inner margin is at the graduation 10 upon the arm 8, where it is clamped in position. The graduation on the inner side of the arm 5 at the point where it now crosses the inner side of the arm 8 will indicate in feet and inches the total length of the rafter to be cut, and the angle at the point 4 will indicate the bevel for the lower end of the rafter, while the angle at the intersection of the arms 5 and 8 will indicate the bevel for the upper end of the rafter. If desired, the instrument may be laid with the inner margin of the side 5 in contact with one edge of the rafter and the base member and the arm 8 crossing it with the point 4 at the point where the bevel for the lower end is to be made. By marking along the inner margin of the base member when the instrument is in this position the line along which the rafter is to be cut will be obtained. By then measuring along the rafter from the point at which the beginning of this cut is to be made the number of feet and inches corresponding to the measurement indicated upon the arm 5 and then placing the instrument with the point of intersection of the inner margins of the arms 5 and 8 at the point just obtained and having the arm 5 in contact with the edge of the rafter, as before, the line along which the upper bevel is to be made may be obtained by merely marking along the inner margin of the arm 8. It will be seen that with this instrument it is also a matter of little difficulty to determine the proper bevels for rafters whose length is known and either the height of the ridge-pole and the width of the house known. It will also be seen that by swinging the arm 5 into close contact with the base member 1 and securing it in that position the instrument may be used as an ordinary square.

When it is desired to fold the instrument into small compass before returning it to the tool-chest, the thumb-screws 9 and 11 are released and the arm 8 is slid to the end 3 of the base member and swung on the thumb-screw as a pivot until the arm overlies the base member. This movement is permitted by the arc-shaped end 3, which allows the plate or shoulder 10 to travel around it as the arm is swung. The arm 5 is swung into contact with the edge of the base member 1, and the free end is then folded over upon the pivoted end by means of the hinge at 7. The members may then be secured in this position by means of the thumb-screws, if desired.

Having now fully described and shown the construction and operation of my combined bevel and square, what I claim as my invention, and desire to secure by Letters Patent, is—

1. The combination in an instrument of the class described, of a base member, an arm slidably mounted on the base member, said arm having a lug adapted to contact with said base member and hold said arm at a fixed angle thereto when in operative position, said base member being so formed that the arm may be swung over the base and superposed thereon when not in use.

2. The combination in an instrument of the class described, of a base member having a slot extending longitudinally thereof and terminating near the ends of said base, one of said ends being formed in an arc of ninety degrees, an arm secured to said base member by means of a thumb-screw passing through said slot and having a shoulder at the end thereof adapted to abut against said base member in order to maintain said arm at a definite angle to said base member, but permitting said arm to be swung over said base member when moved to the limit of its travel toward the arc-shaped end of said base member.

In testimony that I claim the foregoing as my own I have hereto affixed my signature in the presence of two witnesses.

JAMES W. MURPHY.

Witnesses:
A. R. HUGHES,
E. W. SNODDY.